US010089959B2

(12) United States Patent
Jangda et al.

(10) Patent No.: US 10,089,959 B2
(45) Date of Patent: Oct. 2, 2018

(54) DISPLAY WITH CONTINUOUS PROFILE PEAK LUMINANCE CONTROL

(71) Applicant: Apple Inc., Cupertino, CA (US)

(72) Inventors: Mohammad Ali Jangda, San Jose, CA (US); Koorosh Aflatooni, Los Altos Hills, CA (US); Yafei Bi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 14/869,437

(22) Filed: Sep. 29, 2015

(65) Prior Publication Data

US 2016/0314760 A1 Oct. 27, 2016

Related U.S. Application Data

(60) Provisional application No. 62/152,728, filed on Apr. 24, 2015.

(51) Int. Cl.

| | |
|---|---|
| ***G09G 3/20*** | (2006.01) |
| ***G09G 3/32*** | (2016.01) |
| ***H04N 1/60*** | (2006.01) |
| ***H04N 5/57*** | (2006.01) |
| ***G09G 5/10*** | (2006.01) |
| ***G09G 3/3208*** | (2016.01) |

(52) U.S. Cl.

CPC ............. *G09G 5/10* (2013.01); *G09G 3/2003* (2013.01); *G09G 3/3208* (2013.01); *G09G 2310/027* (2013.01); *G09G 2320/0606* (2013.01); *G09G 2320/0626* (2013.01); *G09G 2320/0673* (2013.01); *G09G 2330/021* (2013.01); *G09G 2330/028* (2013.01); *G09G 2360/144* (2013.01); *G09G 2360/16* (2013.01)

(58) Field of Classification Search

CPC ........................... G09G 3/2014; G09G 3/3233

See application file for complete search history.

(56) References Cited

U.S. PATENT DOCUMENTS

| | | | | |
|---|---|---|---|---|
| 5,870,154 | A | 2/1999 | Conover et al. | |
| 6,762,741 | B2 | 7/2004 | Weindorf | |
| 8,730,275 | B2 | 5/2014 | Mori | |
| 2002/0145583 | A1 * | 10/2002 | Kobayashi ........... | G09G 3/3611 345/98 |

(Continued)

*Primary Examiner* — Lin Li

(74) *Attorney, Agent, or Firm* — Treyz Law Group, P.C.; Jason Tsai

(57) ABSTRACT

A display may have an array of display pixels. Digital display data may be received by a digital-to-analog converter that converts the digital display data to analog display data. The magnitudes of the analog display data signals can be controlled by a regulated voltage received by the digital-to-analog converter. A brightness controller may have multiple peak luminance control (PLC) profiles. In accordance with an embodiment, a brightness setting may be processed by a lookup table to identify a pair of PLC profiles that is interpolated in order to obtain the desired regulated voltage. In accordance with another embodiment, a single PLC profile may be used that is a function of a combined parameter that takes into account both average frame luminance and the brightness setting. In accordance with yet another embodiment, a lookup table that specifies brightness setting offset values may be used to directly modulate the brightness setting.

11 Claims, 14 Drawing Sheets

(56) References Cited

U.S. PATENT DOCUMENTS

| | | | | |
|---|---|---|---|---|
| 2005/0190142 | A1 | 9/2005 | Ferguson | |
| 2006/0274213 | A1* | 12/2006 | Saier | H04N 5/57 348/673 |
| 2008/0150970 | A1* | 6/2008 | Ozawa | G09G 3/2014 345/690 |
| 2010/0085341 | A1* | 4/2010 | Hasegawa | G09G 3/3233 345/208 |
| 2010/0253664 | A1 | 10/2010 | Byun et al. | |
| 2011/0050744 | A1* | 3/2011 | Kikuta | G09G 3/3233 345/690 |
| 2011/0050751 | A1* | 3/2011 | Park | G09G 3/3208 345/690 |
| 2011/0254878 | A1 | 10/2011 | Mori et al. | |
| 2012/0200589 | A1* | 8/2012 | Min | H04N 1/6008 345/591 |
| 2013/0335457 | A1 | 12/2013 | Yano et al. | |
| 2014/0152704 | A1* | 6/2014 | Jeong | G09G 3/3233 345/690 |
| 2014/0375704 | A1 | 12/2014 | Bi et al. | |
| 2015/0097872 | A1* | 4/2015 | Jeong | G09G 3/3225 345/690 |
| 2015/0123955 | A1 | 5/2015 | Bi et al. | |
| 2015/0154913 | A1* | 6/2015 | Kim | G09G 3/3233 345/691 |
| 2015/0170560 | A1* | 6/2015 | Lim | G09G 3/3291 345/691 |

* cited by examiner

54

| DBV | INTERPOLATE BETWEEN: |
|---|---|
| 990-1023 | P1 & P2 |
| 955-989 | P2 & P3 |
| 921-954 | P3 & P4 |
| 877-920 | P4 & P5 |
| <886 | PLC OFF |

*FIG. 9*

247

| | | APL | | | | | | | |
|---|---|---|---|---|---|---|---|---|---|
| | Profile | 44 | 52 | 60 | 68 | 76 | 84 | 92 | 100 |
| VREG2 Setting (Max 255) | 1 | 255 | 255 | 255 | 255 | 248 | 241 | 234 | 227 |
| | 2 | 255 | 255 | 255 | 255 | 255 | 245 | 239 | 234 |
| | 3 | 255 | 255 | 255 | 255 | 255 | 255 | 243 | 239 |
| | 4 | 255 | 255 | 255 | 255 | 255 | 255 | 255 | 247 |
| | 5 | 255 | 255 | 255 | 255 | 255 | 255 | 255 | 255 |

103 101

*FIG. 10*

249

| | APL | | | | | | | |
|---|---|---|---|---|---|---|---|---|
| | 44 | 52 | 60 | 68 | 76 | 84 | 92 | 100 |
| Output LUT | 255 | 255 | 255 | 255 | 255 | 249 | 240 | 236 |

*FIG. 11*

247'

| | | APL | | | | | |
|---|---|---|---|---|---|---|---|
| | Profile | 44 | • • • | 66 | 74 | 92 | 100 |
| DBV_delta | 1 | 0 | | 0 | 40 | 131 | 172 |
| | 2 | 0 | | | | | |
| | 3 | 0 | | | | • • • | |
| | 4 | 0 | | | | | |
| | 5 | 0 | | 0 | 0 | 0 | 0 |

*FIG. 18*

DISPLAY WITH CONTINUOUS PROFILE PEAK LUMINANCE CONTROL

This application claims the benefit of provisional patent application No. 62/152,728 filed on Apr. 24, 2015, which is hereby incorporated by reference herein in its entirety.

BACKGROUND

This relates generally to electronic devices and, more particularly, to electronic devices with displays.

Electronic devices often include displays. The overall brightness level of many displays is adjustable. For example, a display may have a brightness setting that can be increased or decreased manually by a user. A display might also have a brightness setting that is automatically adjusted in response to ambient light measurements. With this type of automatic brightness level control, the display can be automatically made brighter when ambient lighting conditions become bright to help ensure that the display remains visible to the user.

To ensure that displays do not consume too much power and to help enhance display longevity, electronic devices often use a peak luminance control algorithm (sometimes referred to as automatic current limiting).

When peak luminance control functionality is enabled, the peak luminance of displayed images is reduced whenever the content being displayed exhibits large values of average frame luminance. This ensures that the amount of current and therefore the amount of power that is drawn by the display will be capped. In addition to limiting power consumption, this may help limit temperature rise in the display and thereby extend the lifetime of display pixels in the display.

When the average luminance of a frame of image data is low, the display is allowed to display content with a large peak luminance. In this situation, a display with sparse content such as a few icons on a black background can display the content brightly.

Challenges arise when using a device that has an adjustable display brightness setting and a simultaneously active peak luminance control algorithm. As an example, in dim lighting conditions or other situations in which the brightness setting is low, the use of a peak luminance control algorithm that further reduces luminance upon detection of frames of data with high average luminance may reduce luminance so much as to make it difficult or impossible to view content on the display.

It would therefore be desirable to be able to provide improved ways in which to handle brightness settings and peak luminance control operations in a display.

SUMMARY

An electronic device may include a display having an array of display pixels. The array of display pixels may contain rows and columns of organic light-emitting diode display pixels that display images for a user.

In accordance with an embodiment, the display may include a gamma reference block having an input that receives digital data for the images, an output that supplies corresponding analog data signals for the images to columns of display pixels in the array, and a power supply terminal that receives a regulated voltage and a brightness control block that performs interpolation between selected first and second peak luminance control (PLC) profiles to obtain an interpolated lookup table listing interpolated voltage settings that control the regulated voltage. The display may also include an average pixel luminance calculator that receives the digital data and that outputs a corresponding average pixel luminance (APL) value for one of the images to the brightness control block. The average pixel luminance may sometimes be referred to as the average frame level or average picture level. The interpolated lookup table may be used to determine the value of the regulated voltage as a function of the average pixel luminance value output from the average pixel luminance calculator.

The display may further include a peak luminance control (PLC) profile lookup table that receives a display brightness setting and that identifies the selected first and second PLC profiles from among a plurality of PLC profiles based on the received display brightness setting. In particular, the PLC profile lookup table is configured to identify the selected first and second PLC profiles from among the plurality of PLC profiles for the interpolation when the received display brightness setting falls in a first display brightness interval and is also configured to identify two other PLC profiles from among the plurality of PLC profiles for the interpolation when the received display brightness setting falls in a second display brightness interval that is different than the first display brightness interval. The brightness control block may be configured to compute values for the interpolated lookup table on-the-fly in response to the display brightness setting being changed.

In accordance with another embodiment, a method for operating the display is provided that includes receiving digital data for the images and calculating an average luminance value for one of the images using display control circuitry, receiving a display brightness setting at the display control circuitry, computing a combined parameter that is a function of both the calculated average luminance value and the received display brightness setting, and using the combined parameter to identify a corresponding voltage setting in a peak luminance control (PLC) lookup table to control the brightness of the display. The PLC lookup table may include voltage settings for only a single peak luminance control profile that species a particular threshold level for the combined parameter at which dimming should be initiated. In response to detecting a change in the display brightness setting, the combined parameter may be recomputed to identify another voltage setting in the PLC lookup table that is used to adjust the brightness of the display.

In accordance with yet another embodiment, the display may include: a gamma reference block that receives digital display data and that supplies corresponding analog data signals to the columns of display pixels in the array based on a regulated power supply voltage at a control input to the gamma reference block; and a brightness control block that receives a display brightness setting and that uses a peak luminance control (PLC) lookup table to provide a display brightness setting offset value, where the display brightness setting offset value is applied to the received display brightness setting to dim the brightness of the display. The brightness control block may further include a subtraction circuit that subtracts the display brightness setting offset value from the received display brightness setting to produce an output voltage setting. The brightness control block may also include a digital-to-analog converter that is controlled by the output voltage setting to generate the regulated power supply voltage.

In one suitable arrangement, an average frame luminance calculator that receives the digital display data may be used to output a corresponding average luminance value, where the brightness control block is configured to compute a combined parameter that is a function of average luminance value and the received display brightness setting. The display may then use the combined parameter to identify the display brightness setting offset value in the PLC lookup table. In another suitable arrangement, a peak luminance control module may be used to compute entries in the PLC lookup table by interpolating between display brightness offset values associated with a first peak luminance control profile and display brightness offset values associated with a second peak luminance control profile that is different than the first peak luminance control profile.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 9 is an illustrative peak luminance control profile lookup table that shows which profiles to interpolate between based on the display brightness setting in accordance with an embodiment.

FIG. 10 shows an illustrative average pixel luminance lookup table that plots different VREG2 settings as a function of average pixel luminance for different peak luminance control profiles in accordance with an embodiment.

FIG. 11 shows an illustrative peak luminance control interpolated lookup table for a given display brightness setting that plots different VREG2 settings obtained from interpolating selected settings in the VREG2 lookup table of FIG. 10 in accordance with an embodiment.

FIG. 18 shows an illustrative average pixel luminance lookup table that plots different display brightness setting offset values as a function of average pixel luminance for different peak luminance control profiles, where the offset values can be interpolated to obtain a desired peak luminance control interpolated lookup table in accordance with an embodiment.

DETAILED DESCRIPTION

Figure 1:
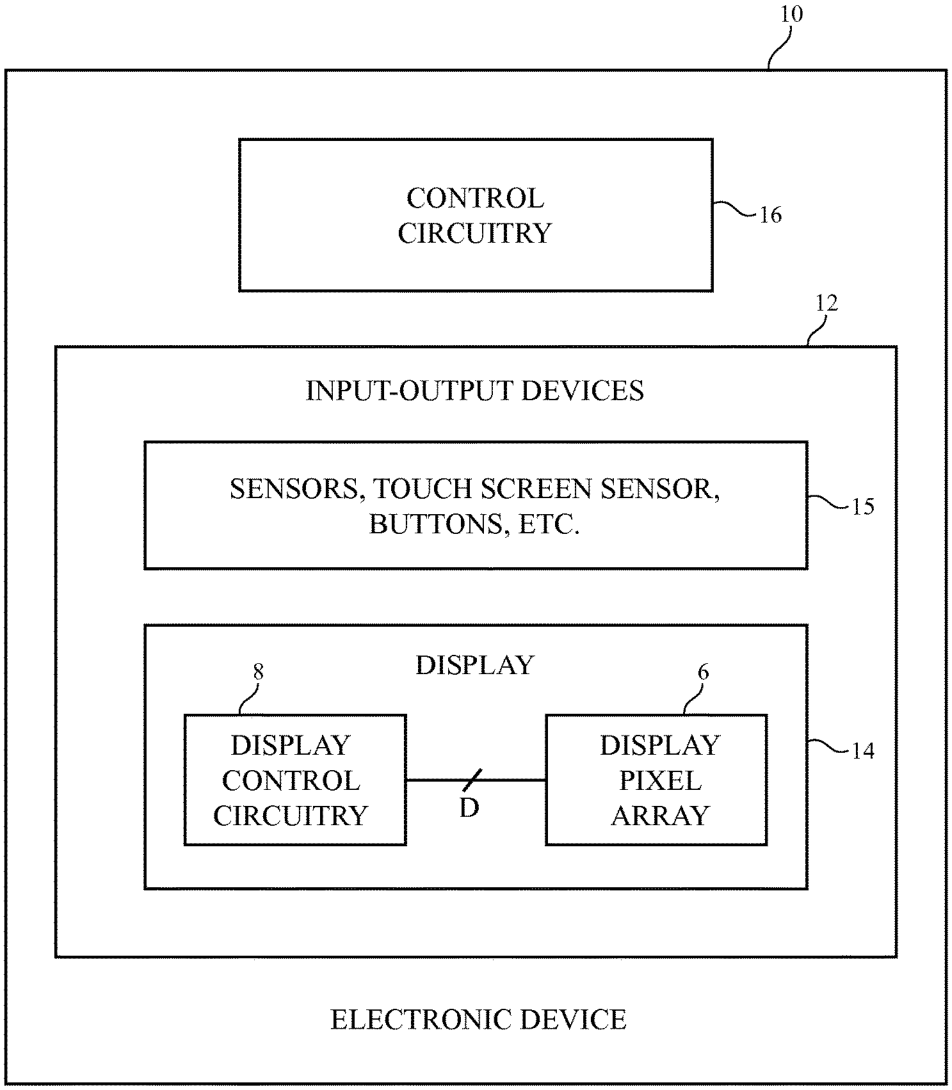
FIG. 1 is a diagram of an illustrative electronic device having a display in accordance with an embodiment.

An illustrative electronic device of the type that may be provided with an organic light-emitting diode display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio codec chips, application specific integrated circuits, etc. Control circuitry 16 may be used to run software on device 10 such as operating system code and applications.

Input-output circuitry in device 10 such as input-output devices 12 may be used to allow data to be supplied to device 10 and to allow data to be provided from device 10 to external devices. Input-output devices 12 may include buttons, joysticks, click wheels, scrolling wheels, touch pads, key pads, keyboards, microphones, speakers, tone generators, vibrators, cameras, sensors (e.g., one or more ambient light sensors), light-emitting diodes and other status indicators, data ports, and other input-output components 15. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may have one or more integrated circuits that form display control circuitry 8 (e.g., a timing controller integrated circuit, gate driver circuitry, column driver circuitry, etc.). Display control circuitry 8 may be used to supply data signals D to columns of display pixels in display pixel array 6. Display control circuitry 8 may also provide control signals (sometimes referred to as gate line signals or scan signals) that are used in addressing rows of display pixels in display pixel array 6. When displaying a frame of data on display 14, display control circuitry 8 may, for example, sequentially assert a gate line signal in each row of display pixel array 6 while analog data signals D are being provided on respective data lines to each column of display pixel array 6. Display pixel array 6 may contain display pixels based on liquid crystal display technology, organic light-emitting diode display pixels, or display pixels formed using other display technologies. Configurations in which display 14 is an organic light-emitting diode display are sometimes described herein as an example. This is merely illustrative. Display 14 may be any suitable type of display.

Figure 2:
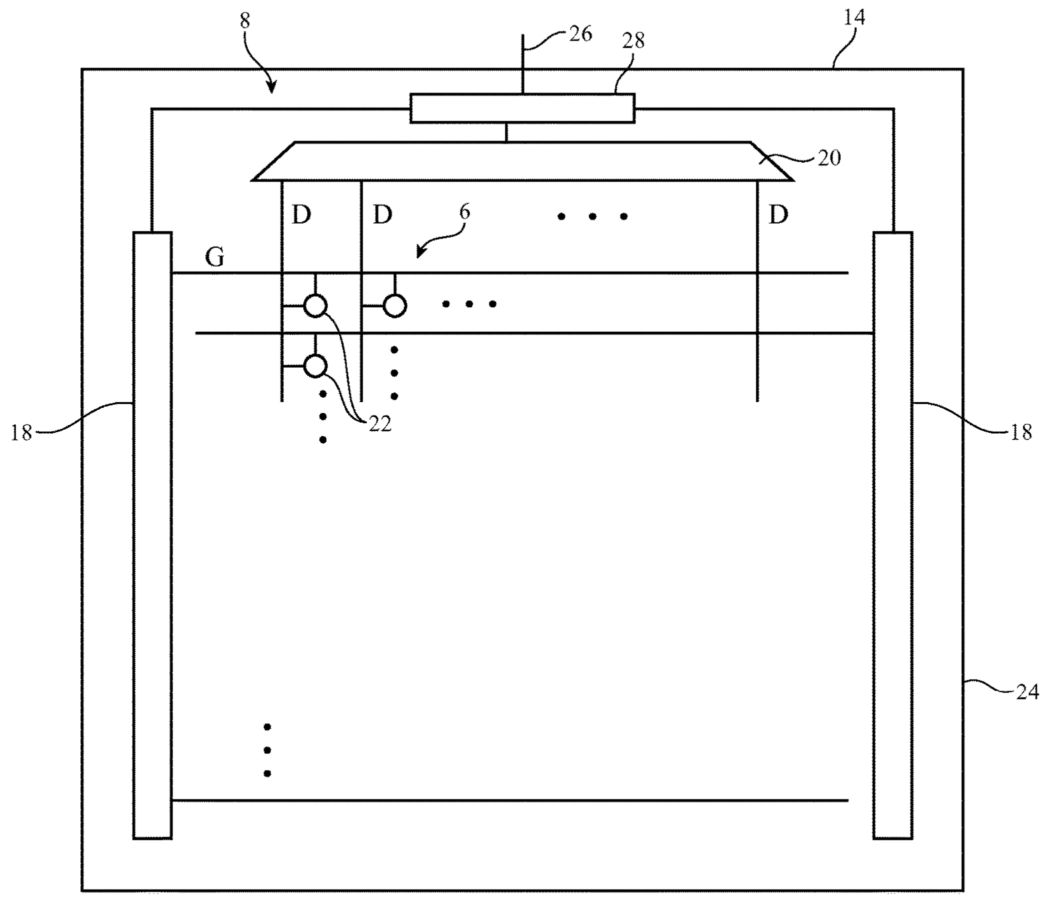
FIG. 2 is a diagram of an illustrative display in accordance with an embodiment.

As shown in the illustrative diagram of FIG. 2, display 14 may have a rectangular array of display pixels 22 for displaying images for a user. The array of display pixels 22 may be formed from rows and columns of display pixel structures (e.g., display pixels formed from structures on display layers such as substrate 24). There may be any suitable number of rows and columns in the array of display pixels 22 (e.g., ten or more, one hundred or more, or one thousand or more).

Display control circuitry 8 (e.g., display driver circuitry) such as display driver integrated circuit 28 may be coupled to conductive paths such as metal traces on substrate 24 using solder or conductive adhesive. Display driver integrated circuit 28 (sometimes referred to as a timing controller chip) may contain communications circuitry for communicating with system control circuitry over path 26. Path 26 may be formed from traces on a flexible printed circuit or other cable. System control circuitry may include a microprocessor, application-specific integrated circuits, and other resources and may be located on a main logic board in an electronic device in which display 14 is being used. During operation, the control circuitry on the logic board (e.g., control circuitry 16 of FIG. 1) may supply display control circuitry 8 such as display driver integrated circuit 28 with information on images to be displayed on display 14.

To display the images on display pixels 22, display driver integrated circuit 28 may supply corresponding analog image data to data lines D while issuing clock signals and other control signals to display driver circuitry such as gate driver circuitry 18 and demultiplexing and column driver circuitry 20.

Gate driver circuitry 18 (sometimes referred to as scan line driver circuitry) may be formed on substrate 24 (e.g., on the left and right edges of display 14, on only a single edge of display 14, or elsewhere in display 14). Circuitry 20 may be used to demultiplex data signals from display driver integrated circuit 28 onto a plurality of corresponding data lines D. With the illustrative arrangement of FIG. 2, data lines D run vertically through display 14. Each data line D is associated with a respective column of display pixels 22. Gate lines G (sometimes referred to as scan lines) run horizontally through display 14. Each gate line G is associated with a respective row of display pixels 22. If desired, there may be multiple gate lines (scan lines) associated with each row of display pixels. Gate driver circuitry 18 may be located on the left side of display 14, on the right side of display 14, or on both the right and left sides of display 14, as shown in FIG. 2.

Gate driver circuitry 18 may assert gate signals (sometimes referred to as scan signals) on the gate lines G in display 14. For example, gate driver circuitry 18 may receive clock signals and other control signals from display driver integrated circuit 28 and may, in response to the received signals, assert a gate signal on gate lines G in sequence, starting with the gate line signal G in the first row of display pixels 22. As each gate line is asserted, data from data lines D is located into the corresponding row of display pixels. In this way, display control circuitry 28, 20, and 18 and other display control circuitry 8 in device 10 may provide display pixels 22 with signals that direct display pixels 22 to generate light for displaying a desired image on display 14.

During operation of device 10, the software running on control circuitry 16 may display images on display 14 by providing digital display data to display control circuitry 8. Digital image data may be displayed in frames on display pixel array 6 by display control circuitry 8. Each frame of data may contain rows and columns of data bits corresponding to the rows and columns of display pixels 22 in display pixel array 6.

Each bit of image data may have one of a number of possible digital values. As an example, each bit may represent a digital level (sometimes referred to as a digital gray level) having one of 256 gray level values ranging from G0 (for a black pixel) to G255 (for a white pixel). Bits with intermediate values may correspond to gray pixel output. The use of colored pixels in array 6 (e.g., red, green, and blue display pixels) provides display 14 with the ability to display color images.

Figure 3:
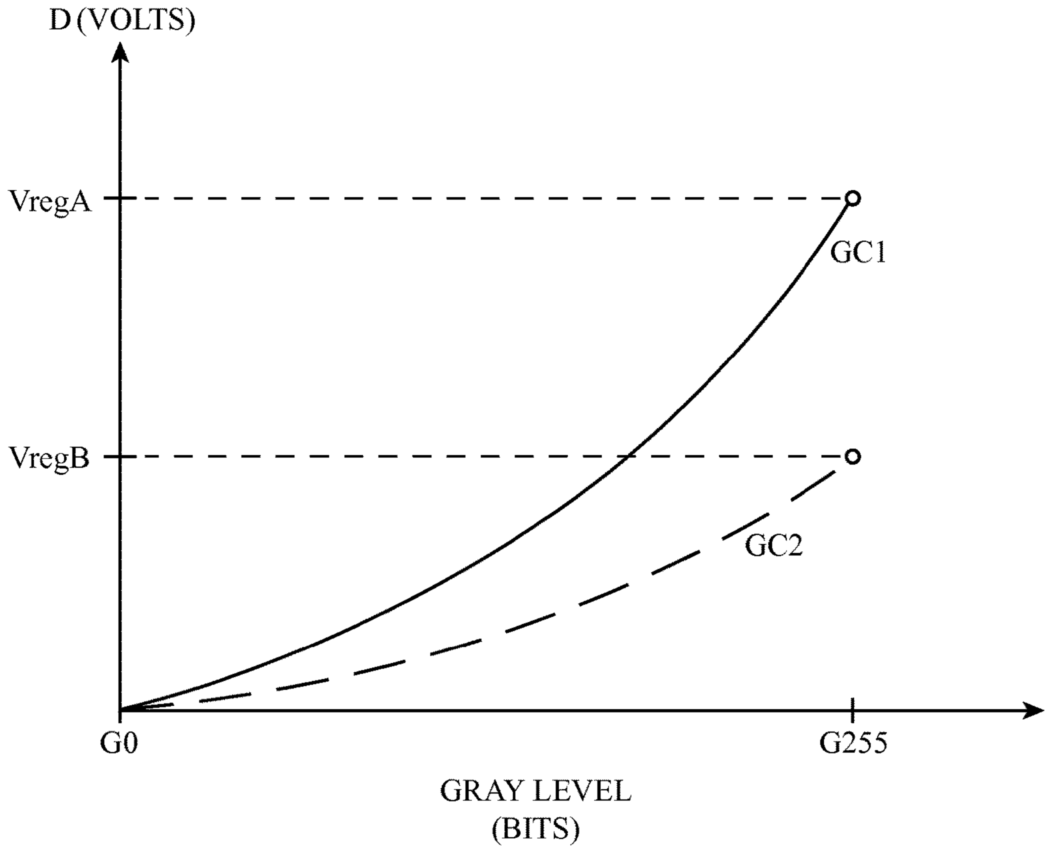
FIG. 3 is a graph showing how the magnitude of analog display data signals varies as a function of digital data values (gray levels) for different display operating conditions in accordance with an embodiment.

A digital-to-analog converter, sometimes referred to as a gamma reference block, may be used to convert digital display data (e.g., gray level values) to analog display data D (e.g., voltage signals corresponding to desired luminance values). FIG. 3 is a graph showing illustrative relationships between digital display data (i.e., gray levels) and analog display data (i.e., analog data signals driven onto a data lines D of FIG. 2) for two different digital-to-analog converter operating conditions. The curves of FIG. 3 show the relationship between digital display data and analog display data D and are sometimes referred to as gamma curves.

During operation of display 14, digital display data (gray level data) is received as an input to the gamma reference block and corresponding analog display data D is provided as an output. A control signal that is sometimes referred to as regulated voltage Vreg may serve as a control signal input to the gamma reference block. The magnitude of signal Vreg controls the size of the data signals D that are produced as a function of gray level input to the gamma reference block. If, for example, Vreg is set to a value of VregA, output data D will follow gamma curve GC1. If Vreg is set to a value of VregB, output data D will follow gamma curve GC2. In this example, curve GC2 is associated with lower output values D than curve GC2 and as a result, display 14 will exhibit lower light output and a smaller maximum luminance when its display pixels are driven in accordance with curve GC2 rather than curve GC1.

The value of Vreg that is to be applied to the gamma reference block at a given point in time may be determined dynamically by a brightness controller. The brightness controller may be implemented using dedicated brightness control circuitry and/or a brightness control algorithm implemented using control circuitry resources such as a microprocessor and memory. The brightness controller may receive a first input such as an average frame luminance input or other information related to the luminance of the digital data to be displayed on display pixel array 6 and may receive a second input such a peak luminance control (PLC) profile number or other input identifying which peak luminance control profile is to be used in displaying data on display pixel array 6. The average frame luminance is sometimes referred to herein as an average picture level (APL) or average pixel level.

Figure 4:
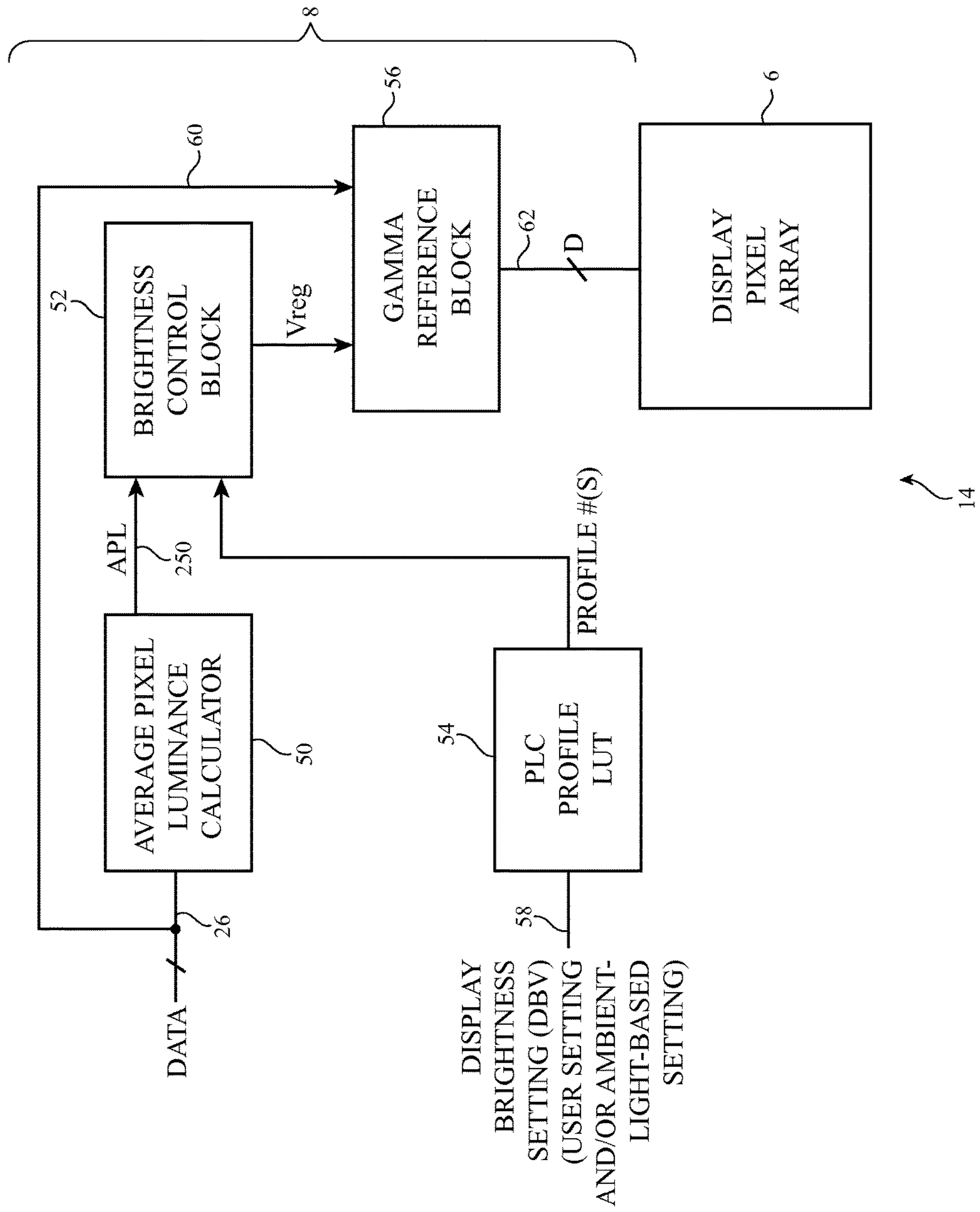
FIG. 4 is a diagram of illustrative control circuitry involved in displaying images on a display in accordance with an embodiment.

FIG. 4 is a schematic diagram of illustrative circuitry that may be used in implementing display 14 of device 10. As shown in FIG. 4, display 14 may have display control circuitry 8 for displaying images on display pixel array 6. Input 58 may be used to receive a user brightness setting from control circuitry 16. Control circuitry 16 may, for example, receive and process user input from input-output devices such as a touch sensor, button, or other input-output component 15. The user input may specify a desired brightness setting (e.g., high, medium, low, etc.). Alternatively, or in combination with receiving and processing user brightness setting input from a user, control circuitry 16 may gather input such as ambient light sensor readings from an ambient light sensor in input-output components 15. Ambient light measurements may be used to automatically determine an appropriate user brightness setting for display 14.

User brightness setting (sometimes referred to herein as display brightness value or "DBV") may be received by control circuitry such as a lookup table (LUT) 54. Lookup table 54 may be used to implement a mapping that maps display brightness values to corresponding peak luminance control profiles. For example, when the DBV is low, LUT 54 may indicate that a first profile be used that permits display of a higher average pixel luminance level before dimming is activated (since there is more power margin at lower brightness settings). On the other hand, when the DBV is high, lookup table 54 may indicate that a second profile be used that activates dimming at a relatively lower average pixel luminance level to help limit power consumption. Lookup table 54 used in this way may therefore sometimes be referred to as a peak luminance control (PLC) profile LUT.

Digital display data to be displayed on display 14 may be received from a system controller (control circuitry 16) at digital data input 26. Average luminance calculator 50 may receive digital data (i.e., frames of digital image content to display on display 14) and may calculate the average picture level APL of each frame of data or may extract other luminance information from the data frames.

Average picture level APL may serve as a first input to a brightness controller such as brightness control block 52. The peak luminance control (PLC) profile number provided from profile LUT 54 or other information identifying which profile is to be selected for use may serve as a second input to brightness control block 52. Brightness control block 52 may maintain multiple available peak luminance control profiles corresponding to the different PLC profile numbers in memory. In response to receipt of a given PLC profile number, brightness controller 52 may select which portion of the peak luminance control profiles is to be active. The selected peak luminance control profile(s) may then be used in computing an output value of Vreg based on the value of APL at the first input to controller 52.

As describe above, gamma reference block 56 may be implemented as a digital-to-analog converter. Gamma reference block 56 coverts digital data on input 60 to corresponding analog data signals on respective data lines D at output 62. The data lines D supply the analog display data from gamma reference block 56 to respective columns of display pixels 22 in display pixel array 6 (see, e.g., FIG. 2).

The value of regulated voltage Vreg that is produced by brightness controller 52 is used as a control input to gamma reference block 56, as described in connection with FIG. 3. In this way, display 14 implements a peak luminance control scheme that is responsive to changes in brightness setting DBV. Changes in brightness setting are used to adjust the shape of the peak luminance control curve that is used in mapping average picture value APL to reference voltage Vreg (and therefore to the magnitude of display data D). As a result, display pixel array 6 does not draw excessive current (or overly reduce display lifetime) while at the same time avoiding situations in which display 14 is overly dimmed due to simultaneous use of peak luminance control and an independent dim brightness setting.

Figure 5:
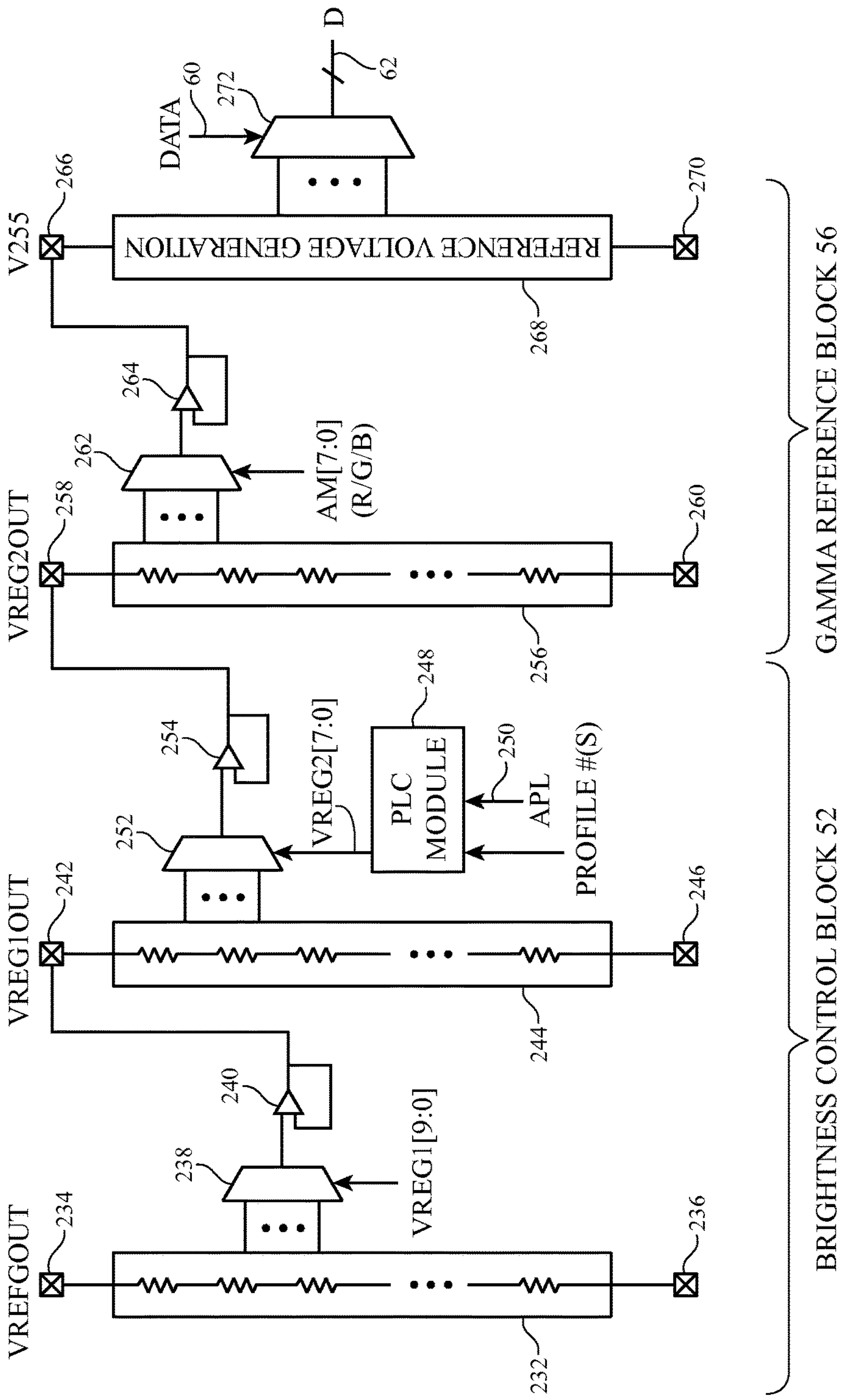
FIG. 5 is a diagram of an illustrative brightness control block and a gamma reference block in accordance with an embodiment.
Figure 19:
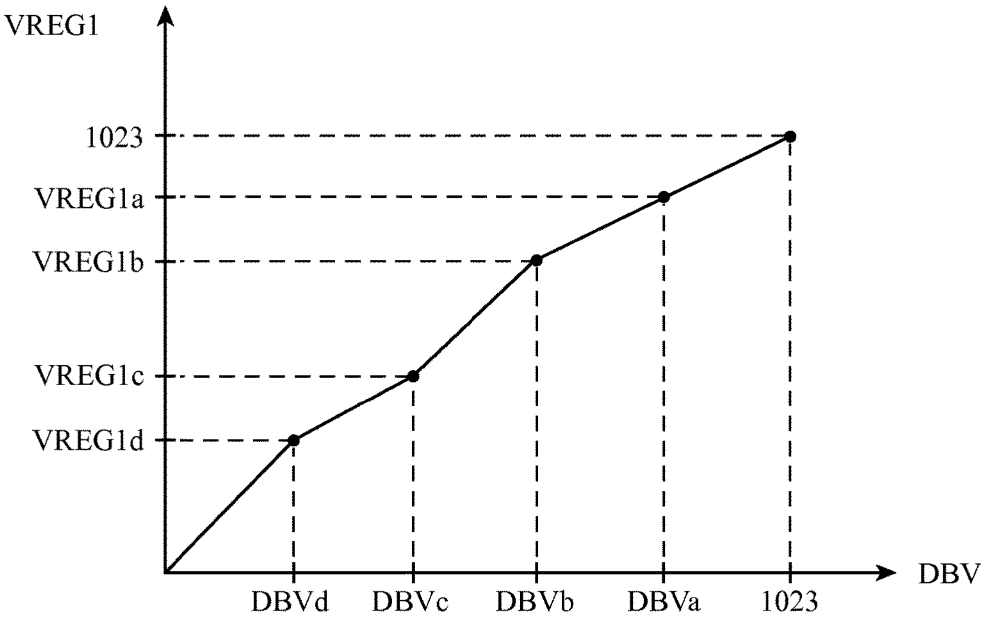
FIG. 19 is a graph plotting the relationship between the user display brightness settings and VREG1 settings in accordance with an embodiment.

FIG. 5 shows one suitable circuit implementation of brightness control block 52 and gamma reference block 56. As shown in FIG. 5, brightness control block 52 may include digital-to-analog converter (DAC) circuitry for converting digital inputs to analog outputs. For example, the digital input signal VREG1[9:0] that corresponds to the user brightness setting DBV can be converted to an analog output signal VREG1OUT using a digital-to-analog converter circuit that includes resistor ladder 232, multiplexer 238, and buffer 240. In general, the value of VREG1 may be obtained based on the DBV setting according to a predetermined lookup table (LUT). Values stored in this type of lookup table may be illustrated in the plot of FIG. 19. As shown in FIG. 19, the VREG1 values corresponding to DBV values of 1023, DBVa, DBVb, DBVc, and DBVd may be calibrated and may therefore map to values 1023, VREG1*a*, VREG1*b*, VREG1*c*, and VREG1*d*, respectively. Any point between these calibrated entries in the lookup table may be linearly interpolated.

Referring back to FIG. 5, resistor ladder 232 may be provided with a first voltage (VREFGOUT) on terminal 234 and a second voltage on terminal 236. Resistors in resistor ladder 232 may be coupled in series between terminals 234 and 236. Terminal 236 may be provided with a fixed voltage (e.g., a ground voltage). Multiplexer 238 may have a digital input that receives user brightness setting VREG1[9:0]. The inputs to multiplexer 238 are coupled to the resistor terminals of the resistors in resistor ladder 232. In response to its digital input, multiplexer 238 will couple a selected one of its inputs to its output, which is passed to terminal 242 as voltage VREG1OUT. The value of VREG1OUT is determined by the display brightness value VREG1[9:0]. When a user does not dim display 14, VREG1OUT will have its maximum value. When a user dims display 14, VREG1OUT will have a reduced magnitude.

The VREG1OUT signal may be provided to another digital-to-analog converter circuit that receives digital input VREG2[7:0]. This DAC circuit includes resistor ladder 244, multiplexer 252, and buffer 254. Resistor ladder 244 has a chain of resistors coupled in series between terminal 242 and terminal 246. Terminal 246 may be provided with a fixed voltage (e.g., ground). Terminal 242 receives voltage VREG1OUT, which is set by the user brightness setting. The inputs of multiplexer 252 are coupled to the terminals of the resistors in resistor ladder 244. The output of multiplexer 252 is passed to terminal 258 via buffer 254.

Peak luminance control circuitry such as PLC module 248 may be used to implement a peak luminance control algorithm. Peak luminance control module 248 may, for example, have a first input that receives the average picture level APL from calculator 50 via path 250 (see, FIG. 4) and a second input that receives the PLC profile number(s) from the profile LUT 54. Configured in this way, a peak luminance control algorithm may be used to produce a desired peak luminance scaling factor VREG2[7:0] based on the computed average luminance value, at least some of the PLC profiles stored in memory, or from other information gathered from the image data.

In response to receiving the peak luminance control algorithm scaling factor VREG2[7:0], multiplexer 252 may supply output voltage VREGOUT2 to terminal 258 of resistor ladder 256. The scaling factor supplied to the input of multiplexer 252 directs multiplexer 252 to produce a value of VREGOUT2 that is a scaled version of the voltage VREG1OUT on terminal 242 of resistor ladder 244. The value of VREGOUT2 is therefore a function both of the user brightness setting VREG1[9:0] supplied to multiplexer 238 and the peak luminance control algorithm scaling factor VREG2[9:0] provided to multiplexer 252.

Still referring to FIG. 5, gamma reference block 56 may also include digital-to-analog converter (DAC) circuitry for converting digital inputs to analog outputs. For example, the digital input signal AM[7:0] that also corresponds to the user brightness setting DBV can be converted to an analog output signal V255 using a digital-to-analog converter circuit that includes resistor ladder 256, multiplexer 262, and buffer 264. Resistors in resistor ladder 256 may be coupled in series between terminal 234 (e.g., the terminal on which VREG2OUT is provided) and terminal 260 (e.g., a terminal on which a fixed low voltage may be provided). Multiplexer 262 may have a digital input that receives setting AM[7:0]. The inputs to multiplexer 262 are coupled to the resistor terminals of the resistors in resistor ladder 256. In response to its digital input, multiplexer 262 will couple a selected one of its inputs to its output, which is passed to terminal 266 as voltage V255. The value of V255 is therefore determined by setting AM[7:0]. The value of V255 is therefore a function both of the user brightness setting VREG1[9:0] supplied to multiplexer 238, the peak luminance control algorithm scaling factor VREG2[9:0] provided to multiplexer 252, and the additional brightness control setting AM[7:0] fed to multiplexer 262.

The V255 signal may be provided to another digital-to-analog converter (DAC) circuit that receives the digital image signal DATA via input path 60 (see, FIG. 4). This DAC circuit may include a multiplexer 272 and a reference voltage generation circuit 268 for generating a predetermined set of reference or "tap" voltages that determine the shape of the gamma curve. Circuit 268 may include a resistor chain that is coupled between terminal 266 (e.g., the terminal on which V255 is provided) and terminal 270 (e.g., a terminal on which a fixed low voltage is provided). The inputs to multiplexer 272 are coupled to intermediate nodes in the resistor chain within circuit 268. The voltages at each of the intermediate nodes may be set by the tap voltages and the value of each resistor in the chain. In response to receiving the digital date signal DATA at input 60, multiplexer 272 will couple a selected one of its inputs to its output, which passes analog signal D to output path 62. In general, signals D generated in this way can be distributed to red (R), green (G), and blue (B) display pixels in the display pixel array in a time multiplexed fashion.

Figure 6:
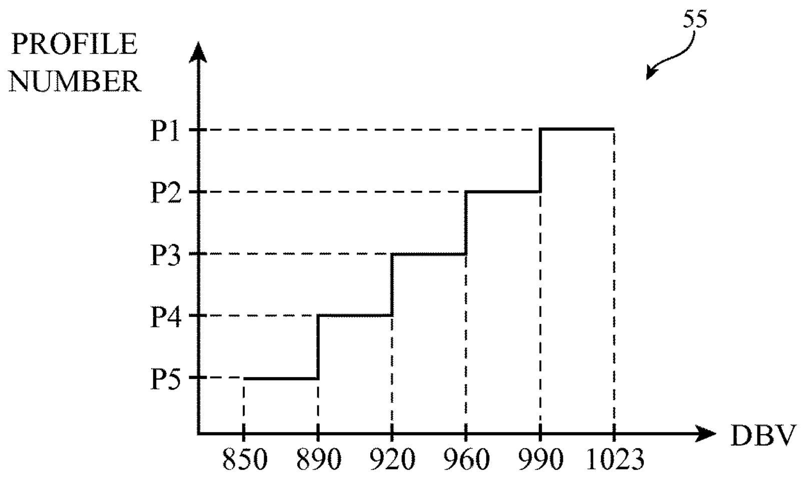
FIG. 6 is a plot showing multiple peak luminance control profiles that can be used for different respective display brightness settings.

FIG. 6 is a plot showing multiple PLC control profiles that can be used for different respective display brightness settings. In FIG. 6, the user brightness setting DBV ranges from 0 to $2^{10}$ (i.e., 1023). The curve of FIG. 6 may be implemented using a PLC lookup table 55 that receives a user brightness setting and that maps the received setting to a particular profile. In particular, DBV settings falling between interval 990-1023 are assigned a first profile number P1; DBV settings falling between interval 960-990 are assigned a second profile number P2; DBV settings falling between interval 920-960 are assigned a third profile number P3; DBV settings falling between interval 890-920 are assigned a fourth profile number P4; and DBV settings falling between interval 850-890 are assigned a fifth profile number P5.

Figure 7:
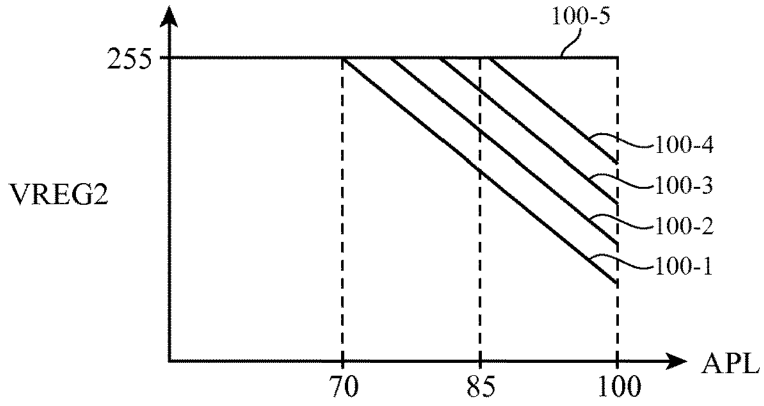
FIG. 7 is a graph plotting VREG2 settings versus average pixel luminance corresponding to the different peak luminance control profiles of FIG. 6.

FIG. 7 is a graph plotting VREG2 settings (i.e., the setting controlling multiplexer 252 in the brightness controller 52 in FIG. 5) versus average pixel luminance for the different peak luminance control profiles of FIG. 6. Curve 100-1 corresponds to profile P1; curve 100-2 corresponds to profile P2; curve 100-3 corresponds to profile P3; curve 100-4 corresponds to profile P4; and curve 100-5 corresponds to profile P5. As shown in FIG. 7, the different curves 100 have different APL thresholds at which dimming (i.e., the lowering of VREG2) is initiated. In the example of FIG. 7, curve 100-1 (which corresponds to profile P1 associated with the highest DBV levels) begins to ramp down at an APL of 70 to help control the power usage for "whiter" images, whereas curve 100-4 (which corresponds to profile P5 associated with the lower DBV levels) begins to ramp down at a higher APL of 85 since there is relatively more power margin for "blacker" images. Curve 100-5 remains flat throughout the entire APL range and represents the case where peak luminance control is idle or deactivated.

Figure 8:
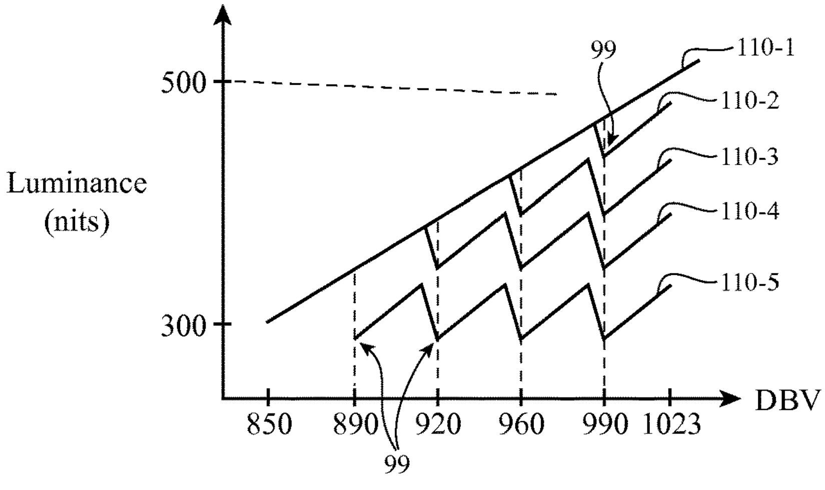
FIG. 8 is a plot showing how a display that is operated in accordance with the settings of FIGS. 6 and 7 can exhibit luminance inversions at the boundaries between the different peak luminance control profiles.

As described above in connection with FIGS. 6 and 7, the dimming behavior as defined by a given profile is shared for all DBV settings corresponding to that profile. In situations where profiles with lower brightness start dimming later at higher APL levels and where profiles with lower brightness have shallower slope (i.e., the slope of curve 100 in FIG. 7), problems can arise where a luminance inversion is observed at the DBV boundaries between two PLC profiles (see, e.g., FIG. 8). FIG. 8 is a graph that plots luminance versus DBV settings for different APL levels.

In particular, curve 110-1 corresponds to a first (low) APL level; curve 110-2 corresponds to a second APL level that is greater than the first APL level; curve 110-3 corresponds to a third APL level that is greater than the second APL level; curve 110-4 corresponds to a fourth APL level that is greater than the third APL level; and curve 110-5 corresponds to a fifth (max) APL level that is greater than the fourth APL level. As shown in FIG. 8, curves 110 exhibit substantial luminance inversions 99 when DBV is adjusted across the profile boundaries. Such sharp drops in luminance may be unpleasant to the user of device 10 and should generally be avoided. Curves 110 corresponding to higher APL levels may generally exhibit more luminance inversions since there is a greater chance for brighter images to traverse more profile boundaries. It is within this context that the embodiments described herein arise.

In accordance with an embodiment, values associated with two or more peak luminance control (PLC) profiles may be interpolated to help mitigate the luminance inversions. Instead of only referring to a single profile number for each DBV interval/band (as described in connection with LUT 55 of FIG. 6), peak luminance control profile LUT 54 may be configured to assign at least two different profile numbers for each DBV band to enable interpolation between the two designated profiles (see, e.g., FIG. 9). As shown in FIG. 9, DBV settings falling in band 990-1023 may trigger interpolation between profiles P1 and P2; DBV settings falling in band 955-989 may trigger interpolation between profiles P2 and P3; DBV settings falling in band 921-954 may trigger interpolation between profiles P3 and P4; DBV settings falling in band 887-920 may trigger interpolation between profiles P4 and P5; and DBV settings below 886 may have peak luminance control turned off (i.e., no dimming is used even at max APL levels). This example in which interpolation is assigned between two different adjacent profiles is merely illustrative. If desired, LUT 54 may specify interpolation between two or more profiles, three or more profiles, five or more profiles, etc.

FIG. 10 shows an illustrative average pixel luminance (APL) lookup table 247 that plots different VREG2 settings as a function of average pixel luminance for different PLC profiles. As described above in connection with FIG. 5, VREG2 may be an 8-bit scaling factor ranging between 0 and 255 that directly controls voltage VREG2OUT that is provided to the gamma reference block 56. Lookup table 247 may list VREG2 settings for a predetermined set of APL values (e.g., 44, 52, 60, 68, 76, 84, 92, and 100). Average pixel luminance values may, in general, be normalized between 0 (min) and 100 (max). As shown in FIG. 10, the VREG2 settings may be ramped down earlier for PLC profiles corresponding to higher DBV values for reasons described above. For example, LUT 247 may specify that profile 1 starts reducing VREG2 at an APL of 76, whereas LUT 247 may specify that profile 3 starts reducing VREG2 at an APL of 92. VREG2 settings for APL levels in between each pair of predetermined APL levels may be interpolated from the surrounding VREG2 values. As an example, an APL of 88 for profile 2 may yield an interpolated VREG2 value of 242.

The interpolation assignment as specified in profile LUT 54 of FIG. 9 may be applied to the APL lookup table 247 of FIG. 10 to arrive at a PLC interpolated lookup table such as output LUT 249 of FIG. 11. Peak luminance control interpolated lookup table may be computed in real time during normal display operation as a function of the current user brightness setting DBV. Table 249 lists different VREG2 settings obtained from interpolating selecting settings in the APL lookup table 247 of FIG. 10.

In accordance with an embodiment, the interpolation of profiles to compute new VREG2 settings may be carried out according to the following equation:

$$VREG2 = \frac{(VREG2_n - VREG2_{n-1})}{DBV_n - DBV_{n-1}} * (DBV - DBV_{n-1}) + VREG2_{n-1} \quad (1)$$

In equation 1, DBV may correspond to the chosen display brightness setting that lies within a DBV band having an upper edge defined by DBVn and a lower edge defined by DBVn−1. Variables "n" and "n−1" may refer to the two different profiles that are associated with the current band of interest (e.g., as specified by the profile LUT of FIG. 9). VREG2*n* may therefore represent the corresponding VREG2 setting for profile n in the APL lookup table 247, whereas VREG2*n*−1 may represent the corresponding VREG2 setting for profile n−1 in the APL lookup table 247.

For example, consider a scenario in which the current DBV setting is equal to 974. According to profile LUT 54 of FIG. 9, a DBV setting of 974 should involve interpolation between profiles 2 and 3. To populate the VREG2 entry corresponding to an APL value of 100 in LUT 249, the corresponding VREG2 values in APL lookup table 247 (see, entries in portion 101 of FIG. 10) associated with both profile 2 and profile 3 may be used to obtain a resulting output value of 236 using equation 1 (e.g., (234-239)/(989-955)*(974-955)+239=236). To populate the VREG2 entry corresponding to an APL value of 92 in LUT 249, the corresponding VREG2 values in APL lookup table 247 (see, entries in portion 103 of FIG. 10) associated with both profile 2 and profile 3 may be used to obtain a resulting output value of 240 using equation 1 (e.g., (239-243)/(989-955)*(974-955)+243=240). Each entry of LUT 249 can be computed in this way for the predetermined set of APL values (e.g., for APL values 44, 52, 60, 68, 76, 84, 92, and 100). The embodiment in which LUT 249 is computed on-the-fly when DBV has been updated is merely illustrative and does not serve to limit the scope of the present invention. If desired, LUT 249 may be precomputed for any number of desired DBV settings (e.g., for higher DBV settings where PLC might be activated) and stored in non-volatile memory within the display control circuitry.

Figure 13:
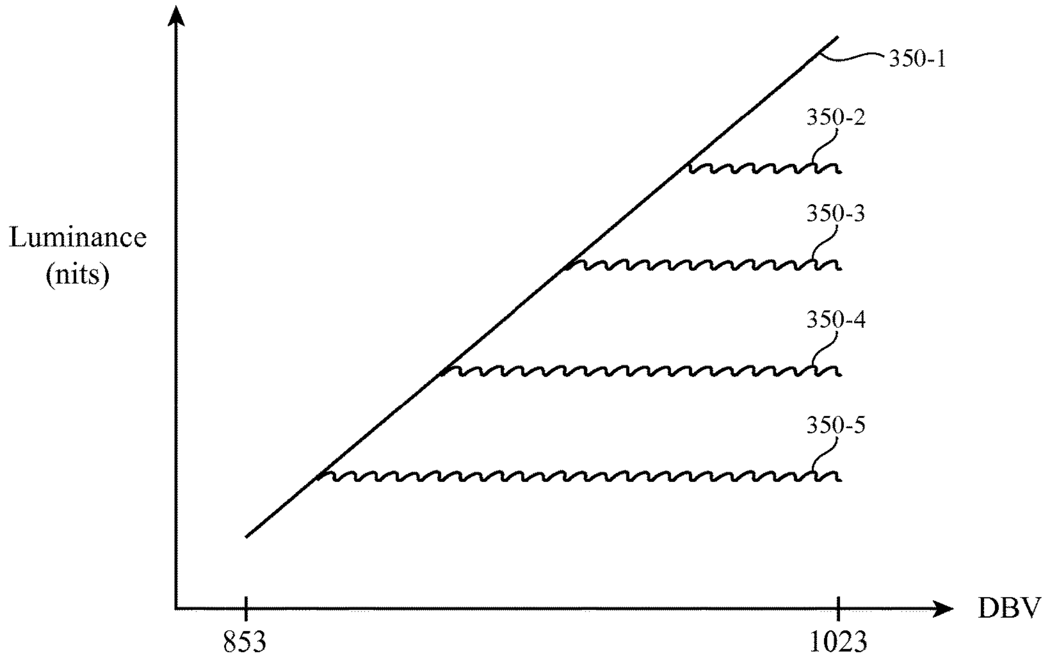
FIG. 13 is a plot showing how a display that is operated in accordance with the steps of FIG. 12 exhibits relatively constant luminance levels across a wide range of display brightness settings.

Using the VREG2 values in the interpolated LUT 249 to control the brightness control block 52 can help dramatically reduce any luminance inversions across DBV values even when peak luminance control is activated. FIG. 13 is a graph that plots luminance versus DBV values for different APL levels when the display control circuitry is operated using the interpolated LUT 249 of the type described in connection with FIG. 11. In particular, curve 350-1 may correspond to a first (low) APL level; curve 350-2 may correspond to a second APL level that is greater than the first APL level; curve 350-3 may correspond to a third APL level that is greater than the second APL level; curve 350-4 may correspond to a fourth APL level that is greater than the third APL level; and curve 350-5 may correspond to a fifth (max) APL level that is greater than the fourth APL level. As shown in FIG. 13, luminance curves 350 are relatively constant as PLC is enabled without any noticeable luminance inversions.

Figure 12:
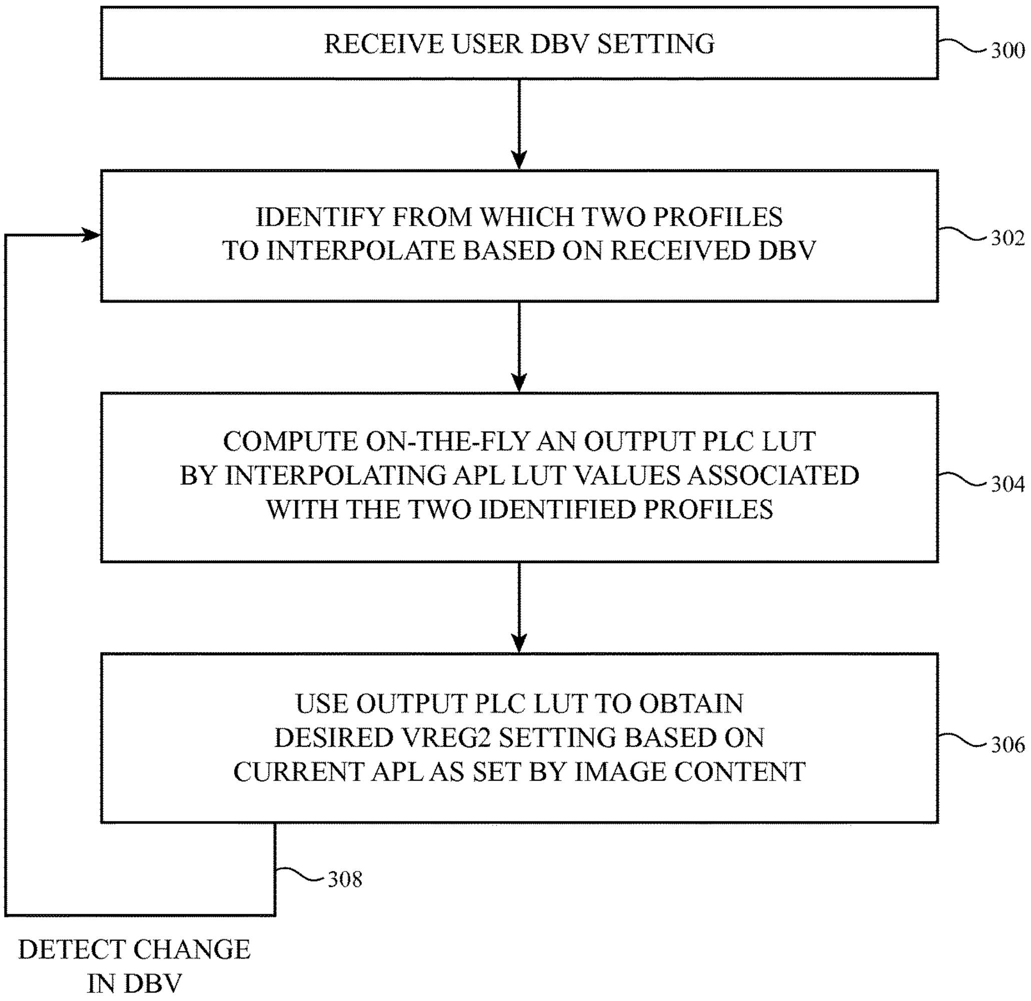
FIG. 12 is a flow chart of illustrative steps for operating display control circuitry to adjust the brightness using a peak luminance control interpolated lookup table of the type shown in FIG. 11 in accordance with an embodiment.

FIG. 12 is a flow chart of illustrative steps for operating display control circuitry to adjust the brightness using a peak luminance control interpolated lookup table of the type shown in FIG. 11. At step 300, the PLC profile LUT (e.g., lookup table 54 of FIG. 9) may receive a user DBV setting. In response to receiving the DBV setting, the PLC profile LUT may then identify from which two profiles to interpolate based on the received DBV setting (step 302). For example, if the current DBV setting falls in the first band between 990-1023, profiles 1 and 2 may be used for interpolation. As another example, if the current DBV setting falls in the third band between 921-954, profiles 3 and 4 may be used for interpolation. These profile numbers may be sent form the PLC profile LUT to the PLC module 248 in the brightness control block 52 (FIG. 5). PLC module 248 may also receive the current APL value computed by APL calculator 50.

At step 304, PLC module 248 may be used to compute on-the-fly an output PLC lookup table by interpolating the APL lookup table (e.g., the APL lookup table 247 of the type shown in FIG. 10). The output PLC lookup table (e.g., the PLC interpolated lookup table 249 of the type shown in FIG. 11) computed in this way may then be used to obtain desired VREG2 settings based on the currently calculated APL value as set by the image content (step 306). If any change in DBV is detected, processing may loop back to step 302 to compute a new interpolated output LUT 249 (as indicated by path 308).

The PLC LUT interpolation scheme described above in connection with the embodiments of FIGS. 9-13 represents merely one way of avoiding substantial brightness inversions while the peak luminance control algorithm is enabled and when the user brightness setting is being adjusted. In accordance with another suitable embodiment, a modified APL calculation scheme can be implemented where the peak luminance control VREG2 setting is calibrated against a combined brightness parameter that takes into about both the average pixel luminance and the user brightness DBV setting instead of just against APL. Configured in this way, the adjustment of VREG2 is based on not only the APL value but also on the current DBV setting. Doing so ensures that any change in the DBV setting (i.e., any change in VREG1) is factored into the peak luminance control algorithm. This combined brightness parameter may sometimes be referred to herein as an "absolute" luminance value LV_abs.

Figure 14:
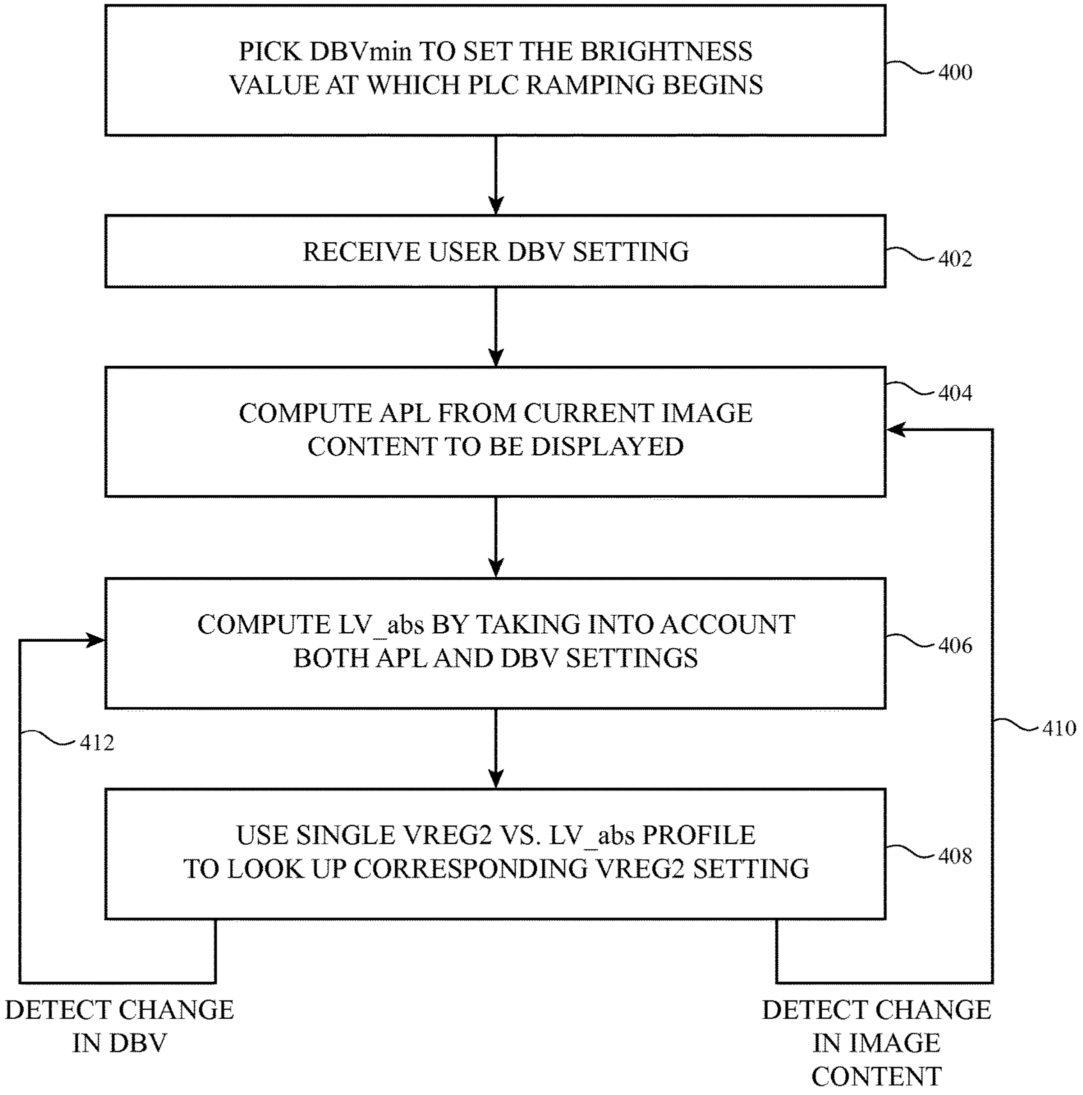
FIG. 14 is a flow chart of illustrative steps for operating display control circuitry to adjust the brightness using a modified average pixel luminance calculation scheme in accordance with an embodiment.

FIG. 14 is a flow chart of illustrative steps for operating display control circuitry to adjust the brightness by computing a lookup table that plots VREG2 against the combined parameter LV_abs. At step 400, a minimum display brightness value DBVmin may be chosen depending on the brightness level at which the PLC ramping behavior should be initiated. DBVmin may be computed based on the following equation:

$$DBV_{min} = \frac{DBV_{on} - APL_{on} * DBV_{max}}{1 - APL_{on}} \quad (2)$$

In equation 2, DBVon may represent the minimum display brightness setting at which PLC should be activated, whereas APLon may represent the minimum average frame luminance (represented as a percentage value) at which PLC should be activated. DBVmax may be equal to 1023 (assuming VREG1 is a 10-bit signal). Consider, for example, a scenario in which DBVon is equal to 853 and APLon is equal to 66%. In this scenario, equation 2 may be used to compute a corresponding DBVmin that is equal to 523 (e.g., (853-0.66*1023)/(1-0.66)=523).

At step 402, the display control circuitry 8 (FIG. 4) may receive the display brightness setting DBV. In this embodiment, only one PLC profile may be used so the PLC profile LUT 54 in FIG. 4 need not be used or may be bypassed. The DBV setting may therefore be directly passed on to the PLC module within the brightness control block 52.

At step 404, calculator 50 may be used to compute an APL from the current image content to be displayed. The computed APL may also be fed to the PLC module (e.g., PLC module 248 in FIG. 5). At step 406, the PLC module may be configured to compute a combined parameter LV_abs by taking into account both the received APL and the received DBV setting based on the following equation:

$$LV_{abs} = \frac{(DBV - DBV_{min})}{DBV_{max} - DBV_{min}} * APL \quad (3)$$

Figure 15:
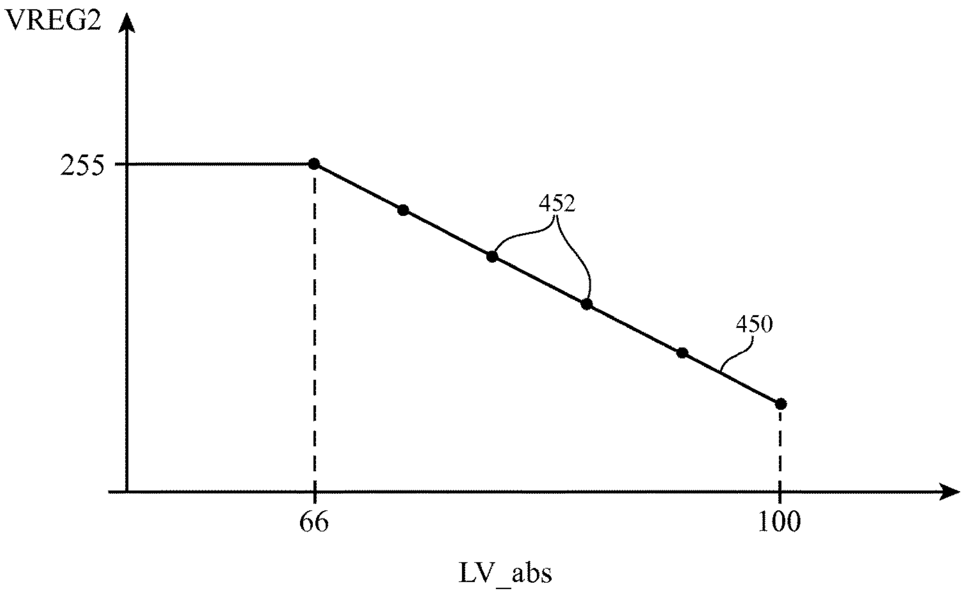
FIG. 15 is a diagram of a single peak luminance control profile that plots VREG2 settings versus a given luminance parameter that is computed based on the average pixel luminance and the display brightness setting in accordance with an embodiment.

In equation 3, APL may be normalized as a number between 0 and 100. Computed in this way using equation 3, LV_abs may therefore also be a value between 0 and 100. VREG2 settings for different LV_abs values computed using equation 3 may be calibrated and compiled into a single profile such as profile 450 as illustrated in FIG. 15. FIG. 15 is a diagram of a single peak luminance control profile that plots VREG2 settings versus LV_abs. Points 452 may correspond to calibrated entries that can be stored in a PLC lookup table within PLC module 248. At step 408 (referring back to FIG. 14), profile 450 may be used to look up the corresponding VREG2 setting depending on current computed LV_abs value. For computed LV_abs values that lie between the calibrated points 452, linear interpolation may be performed to obtain the desired VREG2 setting.

If the display control circuitry 8 detects any change in DBV, processing may loop back to step 406 to recompute LV_abs (as indicated by path 412). If the display control circuitry 8 detects any change in the image content, processing may loop back to step 404 to recompute APL. In general, the average pixel luminance may be computed as a function of the 8-bit gray level of red/green/blue signal components and associated coefficients. Operated in this way, the display may likewise exhibit a luminance profile similar to that shown in FIG. 13, where the luminance curves corresponding to different APL levels stay relatively constant without any noticeable luminance inversions.

Figure 16:
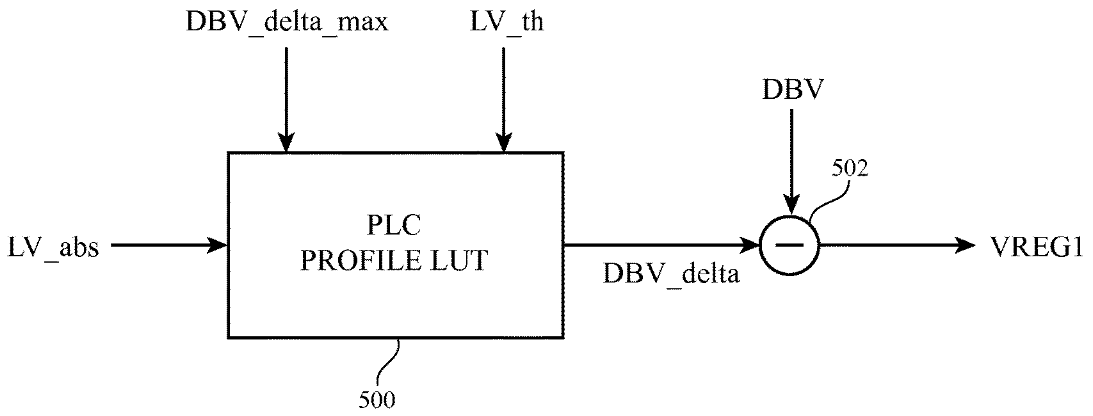
FIG. 16 is a diagram showing illustrative display control circuitry operated using the modified average pixel luminance calculation scheme of FIG. 14 can alternatively be used to directly compute a display brightness setting offset in accordance with an embodiment.

The embodiments thus far describe peak luminance control operations that adjust VREG2. In accordance with other suitable arrangements, the peak luminance control circuitry may be moved to the front of the brightness control block 52 so that the peak luminance control algorithm adjusts DBV (which indirectly changes VREG1 via the relationship shown in FIG. 19). In such implementations, the second digital-to-analog converter of brightness control block 52 (FIG. 5), which includes resistor chain 244, multiplexer 252, and buffer 254, need not be used or may be bypassed. Instead, the brightness control block may be provided with a PLC profile lookup table such as LUT 500 of FIG. 16. As shown in FIG. 16, LUT 500 may receive parameter LV_abs (e.g., a combined parameter computed using equation 3), a max brightness setting offset value DBV_delta_max, a threshold luminance value LV_th, and generate a corresponding output offset value DBV_delta.

Figure 17:
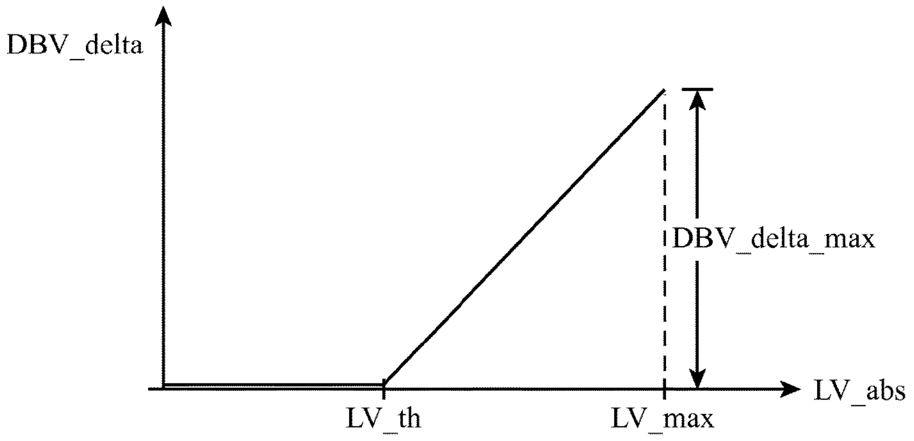
FIG. 17 is a graph plotting display brightness setting offset versus the given luminance parameter of the type shown in FIG. 15 in accordance with an embodiment.

FIG. 17 is a graph plotting display brightness setting offset DBV_delta versus LV_abs. Offset DBV_delta may represent an additional amount of change in DBV that needs to be applied to the received DBV setting in order to properly implement the peak luminance control algorithm. When offset DBV_delta is zero, PLC is not yet activated. When offset DBV_delta is positive, PLC is activated to reduce further reduce the received DBV setting by the specified delta amount. Threshold luminance value LV_th may correspond to the LV_abs value where the PLC profile rolls off. In the example of FIG. 15, threshold LV_th may be equal to 66. Max offset value DBV_delta_max may correspond to the maximum amount of offset that is present when LV_abs is at the maximum value LV_max (e.g., when LV_abs is equal to 100).

Referring back to FIG. 16, LUT 500 may therefore output a corresponding offset DBV_delta based on the profile of the type shown in FIG. 17. The offset generated in this way may be equal to zero when LV_abs is less than threshold LV_th and may monotonically increase as LV_abs is increased above LV_th towards LV_max. As shown in FIG. 16, the brightness control block may also be provided with a subtraction circuit 502 having a first input that receives the user brightness setting DBV, a second input that receives offset DBV_delta from LUT 500, and an output at which the result of the difference between DBV at the first input and offset DBV_delta at the second input of subtraction circuit 502 is provided. In other words, VREG1 may be provided at the output of subtraction circuit 502, where VREG1 is computed by subtracting offset value DBV_delta from the received user brightness setting DBV. Configured in this way, luminance inversions can be prevented while implementing the peak luminance control algorithm without the use of VREG2 (e.g., the digital-to-analog circuit associated with resistor chain 244 and multiplexer 252 can be removed).

In accordance with yet another suitable embodiment, instead of maintaining an APL lookup table such as LUT 247 of FIG. 10, the PLC module 248 (FIG. 5) may be configured to maintain an APL lookup table 247' that specifies DBV_delta offset values instead of VREG2 values (see, e.g., FIG. 18). FIG. 18 shows an illustrative APL lookup table that plots different display brightness setting offset values as a function of APL for different peak luminance control profiles. As shown in FIG. 18, the DBV offset values may be set to 0 for low APL values and for PLC profile 5 where the peak luminance control should be turned off. Generally, as APL approaches the maximum level of 100, the amount of offset DBV_delta may be ramped up to help constraint power usage. The steps of FIG. 12 may be likewise applied to the APL lookup table 247' of FIG. 18 to interpolate between profiles to obtain interpolated offset values DBV_delta instead of VREG2 settings for the predetermined set of APL values. Operated in this way, luminance inversions can be prevented while implementing the peak luminance control algorithm without the use of VREG2 (e.g., the digital-to-analog circuit associated with resistor chain 244 and multiplexer 252 can be removed).

The foregoing is merely illustrative and various modifications can be made by those skilled in the art without departing from the scope and spirit of the described embodiments. The foregoing embodiments may be implemented individually or in any combination.

What is claimed is:

1. Display circuitry, comprising:
- an array of display pixels; and
- display control circuitry that displays images on the array of display pixels, wherein the display control circuitry includes:
  - a gamma reference block having an input that receives digital data for the images, an output that supplies corresponding analog data signals for the images to columns of display pixels in the array, and a power supply terminal that receives a regulated voltage;
  - a brightness control block that performs interpolation between selected first and second peak luminance control (PLC) profiles to obtain an interpolated lookup table listing interpolated voltage settings that control the regulated voltage for the gamma reference block; and
  - a peak luminance control (PLC) profile lookup table that receives a display brightness setting and that identifies the selected first and second PLC profiles from among at least three PLC profiles based on the received display brightness setting, wherein the selected first PLC profile is a function of a given range of average pixel level values, and wherein the selected second PLC profile is also a function of the given range of average pixel level values, wherein the brightness control block comprises a peak luminance control (PLC) circuit that receives the selected first and second PLC profiles and an average pixel value and that outputs a peak luminance scaling factor, wherein brightness control block further comprises a first data converter controlled by the peak luminance scaling factor, wherein the brightness control block further comprises a second data converter coupled in series with the first data converter, and wherein the second data converted is controlled by the received display brightness setting.

2. The display circuitry defined in claim 1, wherein the display control circuitry further comprises:
- an average picture level calculator that receives the digital data and that outputs a corresponding average picture level value for one of the images to the brightness control block, wherein the received display brightness setting is a user-selected brightness setting.

3. The display circuitry defined in claim 2, wherein the interpolated lookup table is used to determine the value of the regulated voltage as a function of the average picture level value output from the average picture level calculator.

4. The display circuitry defined in claim 2, wherein the display brightness control block includes an average picture level (APL) lookup table that lists first voltage settings as a function of the average picture level value for the first PLC profile and that lists second voltage settings as a function of the average picture level value for the second PLC profile, and wherein entries in the interpolated lookup table are computed by interpolating between the first and second voltage settings in the APL lookup table.

5. The display circuitry defined in claim 2, wherein the first PLC profile configures the brightness control block to initiate dimming at a first average picture level value, and wherein the second PLC profile configures the brightness control block to initiate dimming at a second average picture level value that is different than the first average pixel picture level.

6. The display circuitry defined in claim 1, wherein the PLC profile lookup table is configured to identify the selected first and second PLC profiles from among the plurality of PLC profiles for the interpolation when the received display brightness setting falls in a first display brightness interval and is also configured to identify two other PLC profiles from among the plurality of PLC profiles for the interpolation when the received display brightness setting falls in a second display brightness interval that is different than the first display brightness interval.

7. The display circuitry defined in claim 1, wherein the brightness control block is configured to compute values for the interpolated lookup table on-the-fly in response to the display brightness setting being changed.

8. A method of operating a display having display control circuitry that displays images on an array of display pixels, comprising:
- receiving digital data for the images and calculating an average pixel luminance value for one of the images using the display control circuitry;
- receiving a display brightness setting at the display control circuitry;
- computing a combined parameter that is a function of both the calculated average pixel luminance value and the received display brightness setting, wherein the combined parameter is a product of the calculated average pixel luminance value and a factor that is proportional to the received display brightness setting, wherein computing the combined parameter comprises computing a first value by calculating the difference between a predetermined minimum brightness setting and the received display brightness setting, wherein computing the combined parameter further comprises computing a second value by calculating the difference between the predetermined minimum brightness setting and a predetermined maximum brightness setting, and wherein computing the combined parameter further comprises dividing the first value by the second value to obtain a third value; and using the combined parameter to identify a corresponding voltage setting in a peak luminance control (PLC) lookup table to control the brightness of the display.

9. The method defined in claim 8, wherein the PLC lookup table includes voltage settings for only a single peak luminance control profile that species a particular threshold level for the combined parameter at which dimming should be initiated.

10. The method defined in claim 8, further comprising:

in response to detecting a change in the display brightness setting, recomputing the combined parameter to identify another voltage setting in the PLC lookup table that is used to adjust the brightness of the display.

11. The method defined in claim 8, wherein computing the combined parameter further comprises multiplying the third value by the calculated average pixel luminance value.

* * * * *